(12) United States Patent
Shioda et al.

(10) Patent No.: US 8,080,916 B2
(45) Date of Patent: Dec. 20, 2011

(54) DIRECT CURRENT MOTOR

(75) Inventors: Naoki Shioda, Kiryu (JP); Yoshichika Kawashima, Kiryu (JP)

(73) Assignee: Mitsuba Corporation, Kiryu-Shi (JP)

( * ) Notice: Subject to any disclaimer, the term of this patent is extended or adjusted under 35 U.S.C. 154(b) by 183 days.

(21) Appl. No.: 12/312,667

(22) PCT Filed: Nov. 20, 2007

(86) PCT No.: PCT/JP2007/072465
§ 371 (c)(1),
(2), (4) Date: May 19, 2009

(87) PCT Pub. No.: WO2008/062791
PCT Pub. Date: May 29, 2008

(65) Prior Publication Data
US 2010/0052440 A1    Mar. 4, 2010

(30) Foreign Application Priority Data

Nov. 22, 2006   (JP) ................................. 2006-316141
Mar. 9, 2007    (JP) ................................. 2007-060355

(51) Int. Cl.
  H02K 23/38   (2006.01)
  H02K 1/22    (2006.01)
(52) U.S. Cl. .................. 310/195; 310/198; 310/216.079
(58) Field of Classification Search ............ 310/154.01, 310/154.08, 154.24, 216.074, 216.079, 216.082, 310/216.085, 216.086, 216.111–216.112, 310/233, 180, 195, 198
See application file for complete search history.

(56) References Cited

U.S. PATENT DOCUMENTS

| | | | |
|---|---|---|---|
| 4,091,300 A * | 5/1978 | Lynch et al. | 310/154.24 |
| 6,079,659 A * | 6/2000 | Yamamura et al. | 242/433.2 |
| 6,819,025 B2 * | 11/2004 | Egawa et al. | 310/216.001 |
| 2003/0111921 A1 | 6/2003 | Honkura et al. | |
| 2004/0095036 A1 | 5/2004 | Yamamoto et al. | |
| 2006/0244334 A1 | 11/2006 | Furui | |

FOREIGN PATENT DOCUMENTS

| | | |
|---|---|---|
| DE | 103 29 106 | 1/2004 |
| JP | 2003-32965 | 1/2003 |

(Continued)

OTHER PUBLICATIONS

Office Action issued on Jun. 8, 2011 in the corresponding German Application No. 11 2007 002 847.5.

*Primary Examiner* — Tran Nguyen
(74) *Attorney, Agent, or Firm* — Kenyon & Kenyon LLP

(57) ABSTRACT

A direct current motor with brushes in which an armature is provided with a rotating shaft that is supported by a yoke housing, an armature core that is fitted and fixed to a rotating shaft from the outer side, and a commutator that is provided on the rotating shaft adjacent to the armature core with nine segments arranged in the circumferential direction. The armature core has nine teeth that extend in the radial direction in a radial pattern and nine slots that are formed between the teeth and extend in the axial direction, the segments having the same polarity are connected with short-circuiting members, and a pair of brushes that make sliding contact with the segments is disposed so as to be mutually point symmetric centered on the rotating shaft. According to the preset invention, it is possible to effectively achieve flattening of the direct current motor.

5 Claims, 13 Drawing Sheets

FOREIGN PATENT DOCUMENTS

| | | |
|---|---|---|
| JP | 2003-189571 | 7/2003 |
| JP | 2003-244870 | 8/2003 |
| JP | 2003-259582 | 9/2003 |
| JP | 3480733 | 10/2003 |
| JP | 2004-056894 | 2/2004 |
| JP | 2004-056895 | 2/2004 |
| JP | 2004-88916 | 3/2004 |
| JP | 2004-239171 | 8/2004 |
| JP | 2006-271160 | 10/2006 |
| JP | 2006-311685 | 11/2006 |

* cited by examiner

DIRECT CURRENT MOTOR

TECHNICAL FIELD

The present invention relates to a direct current motor that is mounted in a vehicle. Priority is claimed on Japanese Patent Application No. 2006-316141, filed Nov. 22, 2006, and on Japanese Patent Application No. 2007-60355, filed Mar. 9, 2007, the contents of which are incorporated herein by reference.

BACKGROUND ART

In general, a direct current motor with brushes is often used as an electric motor mounted in a vehicle such as an automobile. This type of direct current motor is constituted such that permanent magnets of two or four poles are arranged at the inner circumferential surface of a cylindrical yoke housing and an armature on which an armature coil is wound is arranged on the inner surface of this permanent magnet so as to freely rotate. As the permanent magnet, a sintered ferrite magnet formed in the shape of a tile is used in many cases. The armature has an armature core that is externally fitted and fixed on the rotating shaft, and a plurality of slots that are long in the axial direction are formed in the armature core.

Winding wire is singly wound at a predetermined interval in these slots to form a plurality of coils. Each coil is conducted to a segment that is attached to a rotating shaft.

Each segment is capable of making sliding contact with a pair of brushes that are supported in brush holders that are housed in a yoke housing. Then, when direct current is supplied to the coil via these brushes, the rotating shaft is rotated by the magnetic attraction and repulsion that are produced between the magnetic field formed in the armature core and the permanent magnets. The segments at which the brushes make sliding contact change in turn by this rotation, the direction of the current that flows to the coil is switched, so-called rectification is performed, and the armature core continuously rotates.

In recent years, with the increasing performance of automobiles, smaller size and higher output are required of direct current motors. Therefore, a direct current motor has been proposed that adopts an anisotropic rare earth bond magnet that is formed in a hollow cylindrical shape as the permanent magnet and this anisotropic rare earth bond magnet is magnetized to at least four poles. By constituting in this way, it is possible to achieve a smaller size and higher output of the direct current motor (for example, refer to Patent Document 1).

Also, when the brushes are separated from the segments during rotation of the armature, due to the release of magnetic energy that is stored in the coil, electrical discharge occurs between the brushes and the segment, and thereby electrical noise may occur. For this reason, various techniques have been proposed of providing a condenser or choke coil on the outside or inside of the direct current motor, and reducing the electrical noise by this condenser or coil.

For example, in a direct current motor that realizes a compact size and a flattened shape by arranging a pair of brushes at point symmetrical positions centered on the rotating axis (facing arrangement), the choke coil is arranged in a direction that is approximately perpendicular to the plane at which the brushes are disposed, that is, the choke coil is sterically arranged with respect to the brushes. By doing so, without increasing the size of the direct current motor it is possible to arrange the choke coil in the vicinity of the brushes near the generation source of the electrical noise, whereby reduction of the electrical noise is efficiently achieved.

[Patent Document 1] Japanese Patent No. 3480733
[Patent Document 2] Japanese Patent Application, First Publication No. 2004-56894
[Patent Document 3] Japanese Patent Application, First Publication No. 2004-56895

However, in Patent Document 1, when the permanent magnet is magnetized into four poles, the pair of brushes that make sliding contact with the segment need to be arranged at a 90 degree interval. In this way, when the brushes are arranged at a 90 degree interval, the width of the direct current motor in the radial direction increases. For this reason, although it may become a solution means effective for attaining the downsizing of a direct current motor, there is the problem of it being difficult to become an effective solution means for flattening of a direct current motor.

Also, in the flattened direct current motor as in Patent Document 2 and Patent Document 3, the work involved in assembling a choke coil in a steric manner with respect to the brushes with the above conventional art is extremely difficult, and when production efficiency is taken into consideration, there is the problem of it being difficult to realize in practical terms.

The present invention was achieved in view of the above circumstances, and has as its object to provide a direct current motor that can efficiently achieve flattening.

Also, the present invention provides a direct current motor that can readily attach noise prevention elements such as a condenser and choke coil near the brushes while achieving a small size and flatness.

DISCLOSURE OF THE INVENTION

The present invention was achieved in order to solve the above problems, and relates to a direct current motor provided with a yoke housing, a permanent magnet that is fixed to the inner circumferential surface of the yoke housing with the number of magnetic poles being six, and an armature that is supported on the inner side of the permanent magnet in a freely rotatable manner. The armature is provided with a rotating shaft that is supported by the yoke housing, an armature core that is fitted and fixed to the rotating shaft from the outer side, and a commutator that is provided on the rotating shaft adjacent to the armature core with nine segments arranged in the circumferential direction. Also, the armature core has nine teeth that extend in the radial direction in a radial pattern and nine slots that are formed between the teeth and extend in the axial direction, the segments having the same polarity are connected with a short-circuiting member, and a pair of brushes that make sliding contact with the segments is disposed so as to be mutually point symmetric centered on the rotating shaft.

Also, it is preferred that coils are wound on the teeth with a concentrated winding system.

Also, it is preferred that the permanent magnet is a rare earth magnet.

Also, it is preferred that the teeth of the armature core are constituted to be dividable along the axial line direction.

Also, the present invention relates to a direct current motor provided with a yoke housing, a permanent magnet that is fixed to the inner circumferential surface of the yoke housing with the number of magnetic poles being six, and an armature that is supported on the inner side of the permanent magnet in a freely rotatable manner. The armature is provided with a rotating shaft that is supported by the yoke housing, an armature core that is fitted and fixed to the rotating shaft from the outer side, and a commutator that is provided on the rotating shaft adjacent to the armature core with nine segments arranged in the circumferential direction. Also, the armature core has nine teeth that extend in the radial direction in a radial pattern and nine slots that are formed between the teeth and extend in the axial direction. The segments having the same polarity are connected with a short-circuiting member, a pair of brushes that make sliding contact with the segments is arranged with a mutual interval of 60 degrees in the circumferential direction in a brush holder that is housed in the yoke housing, and a pair of power feeding portions that are electrically connected to an external power supply is provided in the brush holder, and the pair of brushes and the pair of power feeding portions are respectively electrically connected.

Also, it is preferred that between at least either one of the pair of brushes and the pair of power feeding elements or the pair of power feeding elements is provided a noise prevention element that straddles them, being respectively electrically connected by the noise prevention element.

Also, it is preferred that the noise prevention element is arranged on the same plane as the brushes of the brush holder.

Also, it is preferred that coils are wound on the teeth with a concentrated winding system.

Also, it is preferred that all crossover wires of the coils that cross over between the slots and are wound on the teeth are bridged to the rotating shaft.

EFFECT OF THE INVENTION

According to the present invention, since the constitution of the direct current motor has six poles, nine slots, and nine segments, and the segments with the same polarity are short-circuited by short-circuiting members, it is possible to make the brushes to be installed a pair. Moreover, since the pair of brushes is arranged so as to be mutually point symmetric centered on the rotating shaft, it is possible to achieve a flattening of the direct current motor compared to the case of the brushes being arranged at 90 degrees relative to each other.

Also, according to the present invention, since the coils are wound with the concentrated winding system, compared to a conventional single winding system, it is possible to reduce an enlargement in size of the armature coil accompanying the winding of the coils. Therefore, it is possible to achieve a further reduction in size of the direct current motor.

Moreover, according to the present invention, since it is possible to divide the teeth from the armature core, it is possible to wind the coils on every tooth. For this reason, it is possible to easily wind the coils on the teeth, and it is possible to improve the working efficiency. Also, since it is possible to ensure sufficient space for winding the coils around the teeth, it is possible to improve the space factor of the armature coil.

According to the present invention, since the constitution of the direct current motor has six poles, nine slots, and nine segments, and by short-circuiting the segments with the same polarity with short-circuiting members the pair of brushes are arranged with a mutual interval of 60 degrees in the circumferential direction, it is possible to make the brush holder small compared to the case of oppositely arranging the pair of brushes. Therefore, it is possible to downsize the direct current motor.

Furthermore, when using a brush holder of almost the same size as a conventional brush holder, it is possible to ensure space between the brushes of the brush holder and the power feeding portions and on approximately the same plane as the brushes. For this reason, it becomes possible to arrange noise prevention elements in this space. Therefore, it is possible to easily attach noise prevention elements in the vicinity of the brushes that are the generation source of electrical noise without enlarging the brush holder.

Also, according to the present invention, since the coils are wound by the concentrated winding system, compared to the conventional single winding system, it is possible to reduce an enlargement in size of the armature coil accompanying the winding of the coils. Therefore, it is possible to achieve a further reduction in size of the direct current motor.

In addition, by bridging the crossover wires of the coils that cross over between the slots to the rotating shaft, it is possible to prevent the start-of-winding and the end-of-winding of the coils that are wound on the teeth from being arranged spreading in the circumferential direction toward the preceding and following coils. For this reason, it is possible to prevent the start-of-winding and the end-of-winding of the coils from becoming caught on adjacent teeth, and it is possible to reliably wind the respective start-of-winding and the end-of-winding on the intended teeth. Thereby, it is possible to easily prevent winding collapse of the coil wound on the teeth, and possible to improve the space factor and possible to prevent unbalancing of the armature due to coil collapse.

Figure 1:
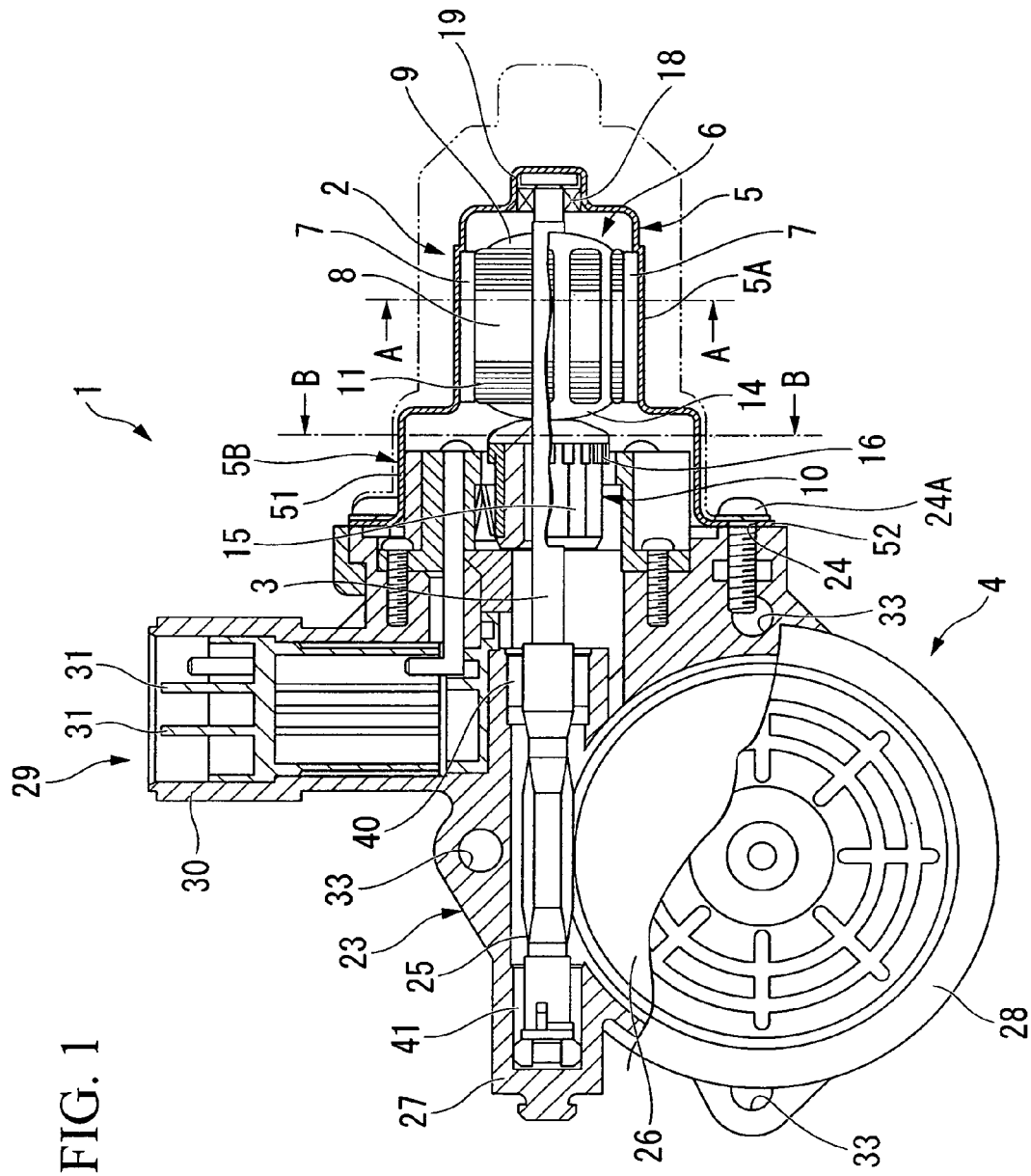
FIG. 1 is a cross-sectional view of the constitution of a power window device in the first embodiment of the present invention.

DESCRIPTION OF REFERENCE NUMERALS 2 direct current motor
3 rotating shaft 5 yoke housing
6 armature
7 permanent magnet
8 armature core
9 armature coil (coil)
9a first coil
9b second coil
9c third coil
10 commutator
12 teeth
13, 13a to 13i slots
14 winding wire
14a crossover wire
15, 15a to 15f segment
17 connecting wire (short-circuiting wire)
20 brush holder
21 brush
65, 66 power feeding portion
68 condenser (noise prevention element)
69 choke coil (noise prevention element)
80 armature core body
81 tooth portion (teeth)

BEST MODE FOR CARRYING OUT THE INVENTION

Next, the first embodiment of the present invention shall be described with reference to FIGS. 1 to 4.

Figure 2:
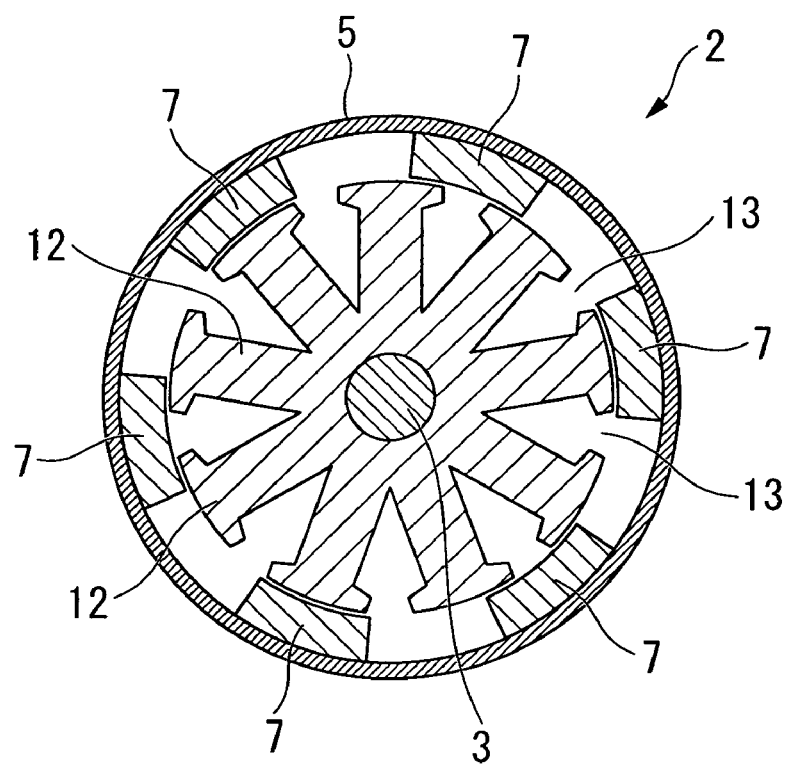
FIG. 2 is a cross-sectional view along line A-A in FIG. 1.
Figure 3:
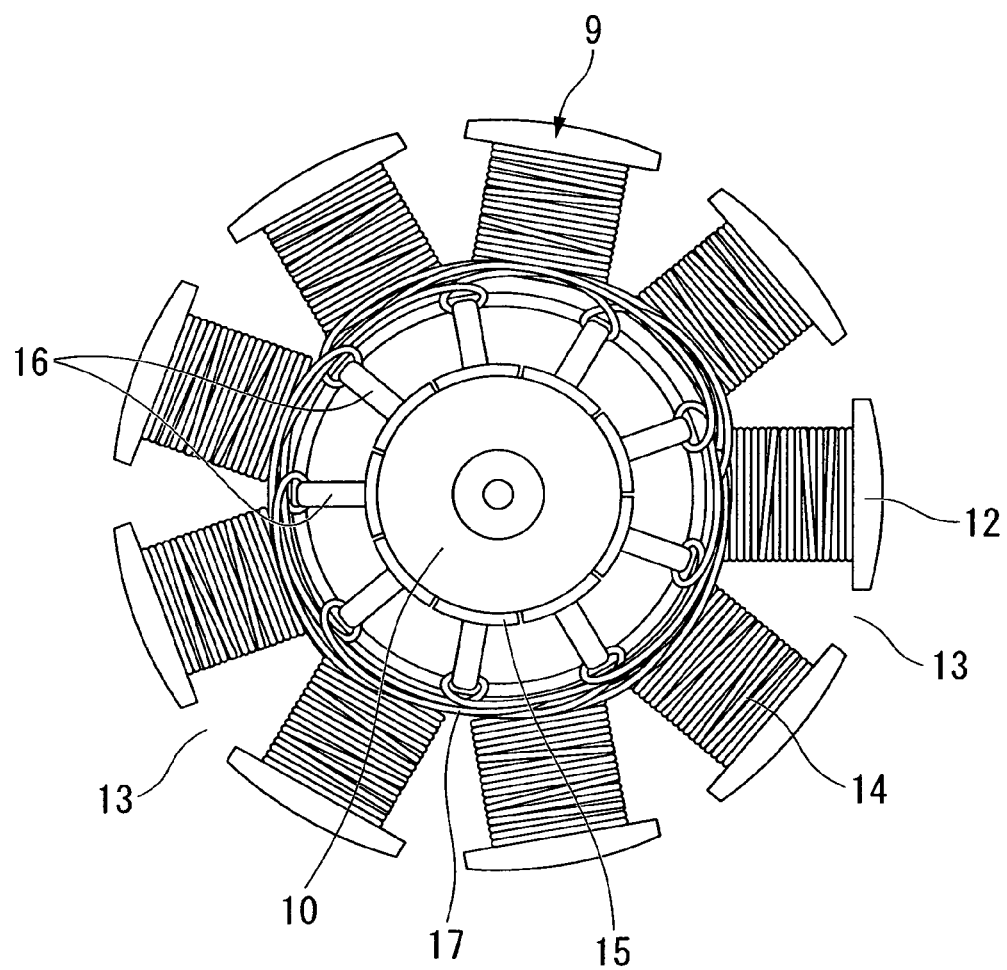
FIG. 3 is a plan view of the armature in the first embodiment of the present invention.
Figure 4:
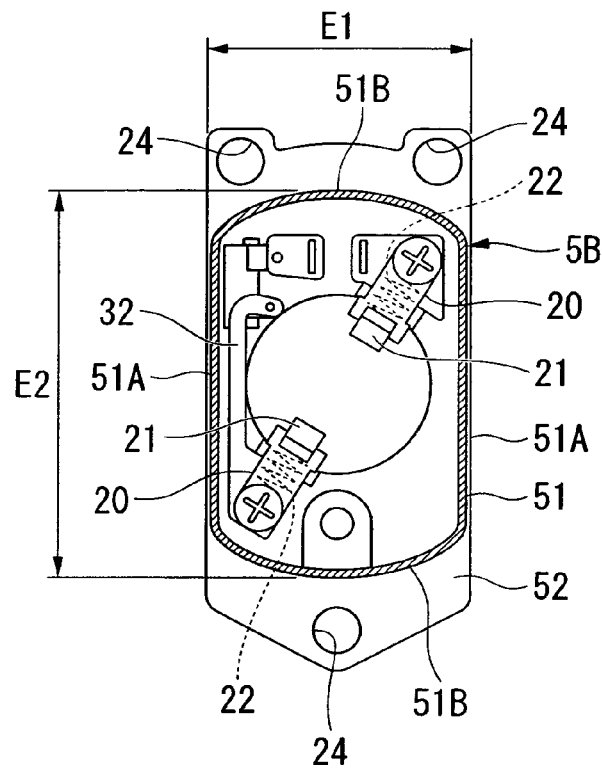
FIG. 4 is a cross-sectional view along line B-B in FIG. 1.

FIG. 1 is a cross-sectional view that shows the constitution of a power window device 1 of a vehicle in which a direct current motor 2 according to the present invention is applied, FIG. 2 is a cross-sectional view along line A-A of FIG. 1, FIG. 3 is a plan view of an armature 6, and FIG. 4 is a cross-sectional view along line B-B of FIG. 1.

As shown in FIGS. 1 to 4, the power device 1 is provided with a direct current motor 2 and a worm gear reducer 4 that is coupled to a rotating shaft 3 of the direct current motor 2, and is installed in a vehicle door (not illustrated). Note that the chain double-dashed line drawn around the direct current motor 2 serves to show the contour of a conventional direct current motor for the purpose of comparison with the direct current motor 2 of the present invention.

The direct current motor 2 is constituted by arranging an armature 6 in a freely rotatable manner within a yoke housing 5 that has a bottomed cylindrical yoke body 5a. Six plate-shaped permanent magnets 7 that are divided in the circumferential direction are fixed at even intervals to the inner circumferential surface of the yoke body 5A. A rare earth magnet, for example, a neodymium sintered magnet, is used for this permanent magnet 7.

The armature 6 consists of an armature core 8 that is fixed to the rotating shaft 3, armature coils 9 that are wound around the armature core 8, and a commutator 10 arranged at one end side of the armature core 8. The armature core 8 is one formed by laminating a plurality of ring-shaped metal plates 11 in the axial direction.

At the outer circumferential portion of the metal plates 11, nine T-shaped teeth 12 (refer to FIG. 2) are formed in a radial pattern at an even interval along the circumferential direction. By fitting and fixing the plurality of metal plates 11 to the rotating shaft 3 from the outer side, dovetail-shaped slots 13 are formed between the adjacent teeth 12 in the outer circumference of the armature core 8. The slots 13 extend in the axial direction, and nine are formed at an even interval along the circumferential direction.

Winding wire 14 coated with enamel is wound between the slots 13, and thereby a plurality of the armature coils 9 are formed at the outer circumference of the armature core 8.

The commutator 10 is fitted and fixed to the one end side of the rotating shaft 3 from the outer side. Nine segments 15 that are formed with an electrically conductive material are attached to the outer circumferential surface of the commutator 10.

The segments 15 are each a plate-shaped metal piece that is long in the axial direction, and are fixed in parallel at an even interval along the circumferential direction in a mutually insulated state. At the end portion of the armature core 8 side of each segment 15, a riser 16 that is bent back in a shape folded back to the outer diameter side is integrally formed. The winding wire 14 that becomes the winding start end portion and the winding finish end portion of the armature coils 9 is wrapped around the risers 16, and the winding 14 is fixed to the risers 16 by fusing. Thereby, the segment 15 and the armature coil 9 that corresponds to it are electrically connected.

Also, as shown in FIG. 3, a connecting wire 17 is respectively wound around the risers 16 that correspond to the segments 15 of the same polarity (every third segment 15 in the present embodiment), and this connecting wire 17 is fixed to the risers 16 by fusing. The connecting wire 17 is for short-circuiting those segments 15 of the same potential, and is routed between the commutator 10 and the armature core 8.

As shown in FIG. 1 and FIG. 4, the other end side of the rotating shaft 3 is supported in a freely rotatable manner by a bearing 18 that is housed in a boss 19 that is formed in a projecting manner in the yoke body 5A. A brush housing portion 5B is provided at the opening end of the yoke body 5A, and is integrally formed with the yoke body 5A. The brush housing portion 5B is formed to be cylindrical with an approximately oblong cross section, and a peripheral wall 51 thereof is constituted by plane walls 51A and curved walls 51B.

On the inner side of the flange housing portion 5B, a pair of brush holders 20 are respectively arranged near portions at which the plane wall 51A and the curved wall 51B meet, and are arranged at mutually point symmetrical positions centered on the rotating shaft 3. Each brush 21 is housed in a brush holder 20 in a freely retractable manner in a state of being biased by a spring 22. The distal end portion of each brush 21 is biased by the spring 22, so as to assume a state of making sliding contact with the commutator 10.

Figure 5:
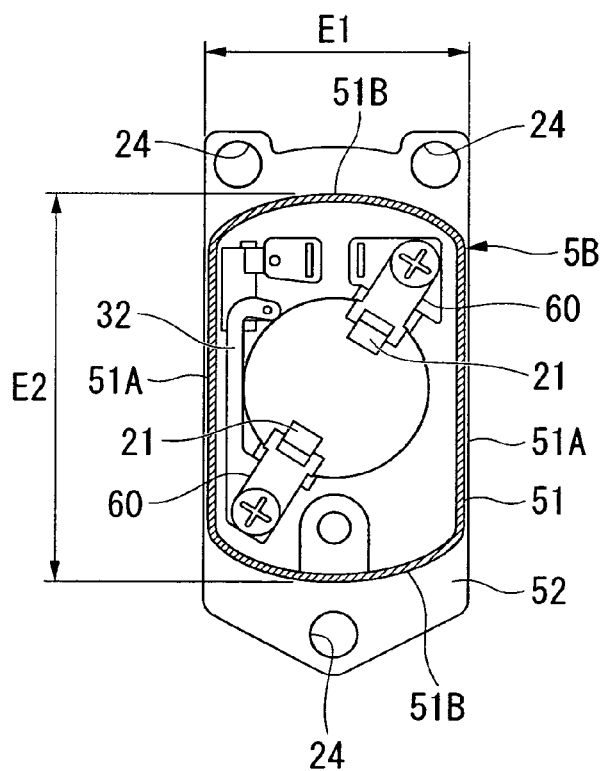
FIG. 5 is an explanatory view that shows another embodiment in FIG. 4.

Note that FIG. 4 describes the case of the brushes 21 being provided in a freely retractable manner in the brush holders 20, but as shown in FIG. 5, blade springs 60 may be used instead of the brush holders 20, with the brushes 21 being supported by the blade springs 60. In this case, each brush 21 is biased by the blade spring 60 so as to assume a state of making sliding contact with the commutator 10.

As shown in FIG. 1, a flange 52 is provided at the opening end of the brush housing portion 5B. A bolt hole 24 for fastening the direct current motor 2 to a gear housing 23 of the worm gear reducer 4 is formed in this flange 52, and a bolt 24A is screwed into this bolt hole 24.

The gear housing 23 is constituted by a worm housing portion 27 that houses a worm 25 that is coupled to one end of the rotating shaft 3 of the direct current motor 2 and a worm wheel housing portion 28 that houses a worm wheel 26 that is meshed with the worm 25.

Both end sides of the worm 25 are supported in a freely rotating manner by bearings 40, 41 that are provided in the worm housing portion 27. The worm 25 and the rotating shaft 3 of the direct current motor 2 are coupled to move mutually freely in the axial direction while being incapable of relative rotation.

The output shaft (not illustrated) that is drive connected to the worm wheel 26 in a rotatable manner with the worm wheel 26 is provided along an orthogonal direction of the rotating shaft 3 of the direct current motor 2. Incidentally, by the rotation of this output shaft not illustrated, the window glass of the vehicle is opened and closed.

Also, the gear housing 23 is provided with a connector 29 facing outward along an orthongal direction of the rotating shaft 3 (upper side in FIG. 1). This connector 29 is for supplying power from the outside to the direct current motor 2. A connector housing 30 of the connector 29 is integrally formed with the gear housing 23. Connecting terminals 31 of the connector 29 are electrically connected with the brushes 21 of the direct current motor 2 via lead wires 32 (refer to FIG. 4). Thereby, the external power comes to be supplied to the commutator 10 via the brushes 21. In addition, three bolt holes 33 that are used when fixing the power window device 1 to the outer periphery of the gear housing 23 are provided.

Figure 6:
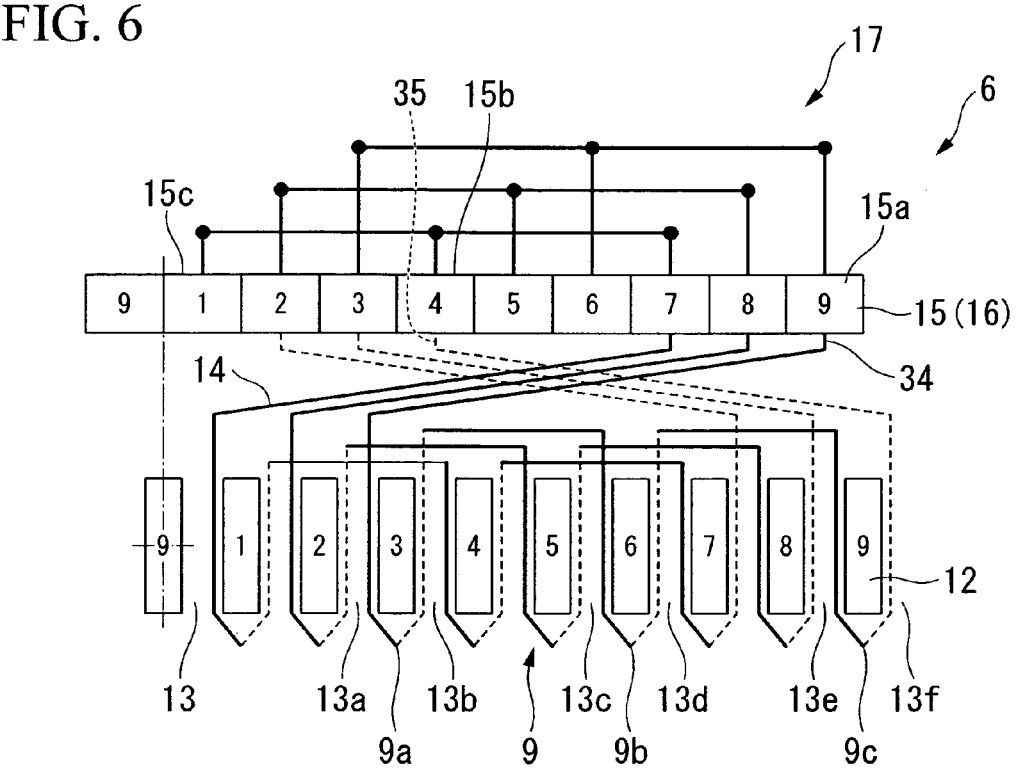
FIG. 6 is a developed view of the armature in the first embodiment of the present invention.
Figure 7:
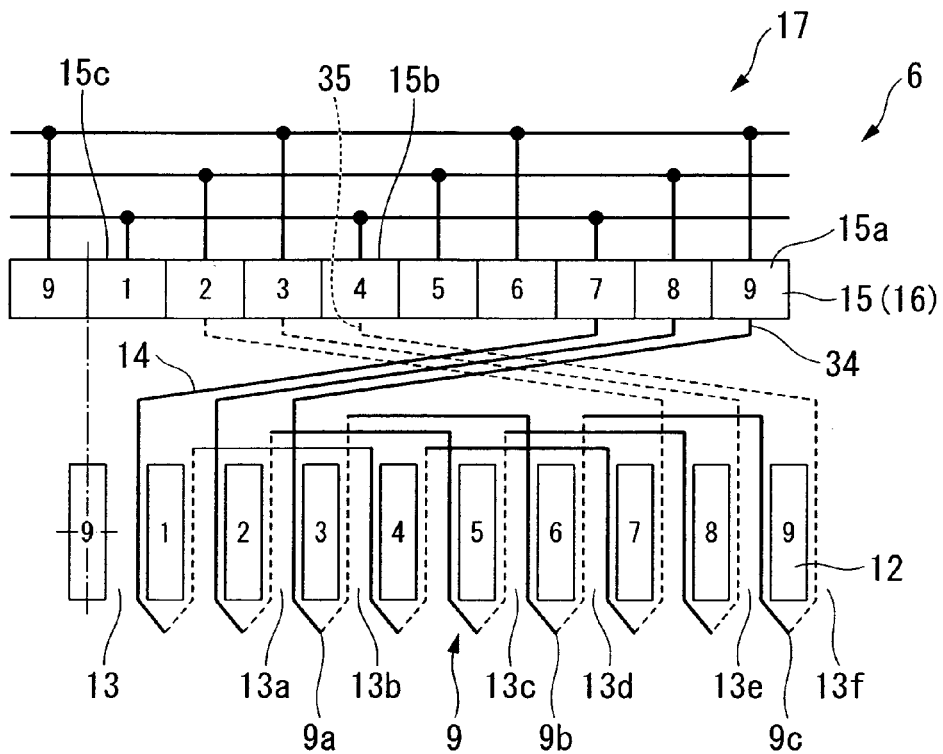
FIG. 7 is a developed view of the armature in the first embodiment of the present invention.

Next, the method of winding the armature coils 9 in the armature 6 of the direct current motor 2 constituted by six poles, nine slots and nine segments shall be explained based on FIG. 6 and FIG. 7.

FIG. 6 and FIG. 7 are developed views of the armature 6, and the gap between adjacent teeth 12 corresponds to the slot 13. Note that in the below drawings, the description is given by applying a respective reference numeral to each tooth 12 and wound winding wire 14.

As shown in FIG. 6, the segments 15 with the same polarity are short-circuited by the connecting wires 17. That is, every three segments 15 (for example, the first segment and the fourth segment, and the fourth segment and the seventh segment) are respectively connected by the connecting wire 17. Note that the connecting wires 17 may be provided so as to connect the segments 15 having the same polarity around the entire circumference as shown in FIG. 7.

As shown in FIG. 6 and FIG. 7, in the case of a start-of-winding 34 of the winding wire 14 being wound starting from the ninth segment 15a, first, after being wrapped around the riser 16 of the ninth segment 15a, the winding wire 14 is drawn into a slot 13a between the second and third teeth 12 that is formed at a 120-degree interval in the circumferential direction from the ninth segment 15a. Then, it is wound around the third tooth 12 n times (n being a natural number of 1 or more) in the forward direction to form a first coil 9a.

Then, the winding wire 14 is drawn out from a slot 13b between the third and fourth teeth 12 and drawn into a slot 13c between the fifth and sixth teeth 12. Then, it is wound around the sixth tooth 12 n times in the forward direction to form a second coil 9b.

Furthermore, the winding wire 14 is drawn out from a slot 13d between the sixth and seventh teeth 12 and drawn into a slot 13e between the eighth and ninth teeth 12. Then, it is wound around the ninth tooth 12 n times in the forward direction to form a third coil 9c.

The winding wire 14, after forming the third coil 9c, is drawn out from a slot 13f between the ninth and first teeth 12 and wrapped around the riser 16 of the fourth segment 15b that is arranged at a 120-degree interval in the circumferential direction from the slot 13f (arranged at a 160-degree interval in the circumferential direction from the ninth segment 15a). Then, an end-of-winding 35 of the winding wire 14 is connected to the fourth segment 15b. Thereby, the armature coil 9 provided with the three coils 9a, 9b, 9c that are connected in series is formed between the ninth and fourth segments 15a and 15b.

Note that the fourth segment 15b to which the end-of-winding 35 is connected to is short-circuited with the first segment 15c that is arranged adjacent to the ninth segment 15a to which the start-of-winding 34 is connected by the connecting wire 17. For this reason, the potential difference between the ninth and fourth segments 15a and 15b is equivalent to the potential difference between adjacent segments.

Similarly, armature coils 9 provided with the three coils 9a, 9b, 9c connected in series are formed in turn between the segments 15 that are arranged at a 40-degree interval. In this way, the armature coils 9 of the direct current motor 2 are wound with the three-phase concentrated winding system.

Accordingly, according to the first embodiment described above, since the constitution of the direct current motor 2 is that of six poles, nine slots and nine segments, in which the number of magnetic poles (permanent magnets 7) is six, the number of slots 13 is nine, and the number of segments 15 is nine, and the segments having the same polarity are short-circuited by the connecting wires 17, it is possible to pair the brushes 21 to be installed. Moreover, it is possible to arrange that pair of brushes 21 at point symmetrical positions centered on the rotating shaft 3, and the arrangement location of each brush 21 is set in the vicinity of the portion where the plane wall 51A and a curved wall 51B of the brush housing portion 5B meet.

For this reason, it is possible to set a width E1 between the plane walls 51A, 51A of the brush housing portion 5B (refer to FIG. 4) to be thinner than a conventional yoke housing (the double-dashed line in FIG. 1), and as a result it is possible to achieve a reduction in size and a flattening of the direct current motor 2. By reducing the size and flattening the direct current motor 2 in this way, it is possible to improve the layout of a circuit breaker, choke coil, condenser and the like that are other electrical components in the restricted internal space of the door of a vehicle in which the power window device 1 is provided.

Note that by setting the installation location of each brush 21 in the vicinity of the portion where the plane wall 51A and a curved wall 51B of the brush housing portion 5B meet, to say nothing of achieving a smaller size and flattening of the direct current motor 2 without making the width E2 between the curved walls 51B, 51B of the brush 5B larger than a conventional yoke housing, it is possible to change the ratio of the width E1 between the flat walls 51A, 51A and the width E2 between the curved walls 51B, 51B by the installation locations of the brushes 21.

Also, according to the first embodiment described above, since the armature coils 9 are wound by the three-phase concentrated winding system, compared to the conventional single winding system, it is possible to reduce an enlargement in size of the armature coils 9 accompanying the winding of the coils. Therefore, it is possible to achieve a further reduction in size of the direct current motor 2 compared to a conventional direct current motor.

Moreover, the first coil 9a is formed by drawing the winding wire 14 into a slot 13 (for example, slot 13a) that is formed at a 120-degree interval in the circumferential direction from a segment 15 to which the start-of-winding 34 is connected (for example, the ninth segment 15a), and the end-of-winding 35 of the winding wire 14 is connected to the segment 15 that is arranged at a 120-degree interval in the circumferential direction from the slot 13 (for example, the slot 13f) where it is drawn out from the third coil 9c. That is, the winding wire 14 is wound on teeth 12 that are arranged shifted 120 degrees in the circumferential direction with respect to the segments 15 at which the start-of-winding 34 and the end-of-winding 35 of the winding wire 14 are connected. For this reason, it is possible to eliminate an enlargement of the armature coils 9 due to twisting of the winding wire that is routed between the commutator 10 and the armature core 8, and it is possible to achieve a further reduction in size of the direct current motor 2.

In the first embodiment described above, by having the permanent magnet 4 be a rare earth magnet (for example, a neodymium sintered magnet), it is possible to obtain larger magnetic characteristics than a conventional sintered ferrite magnet. For this reason, since it is possible to obtain higher output of the direct current motor as well as possible to reduce the armature 6, it is possible to achieve a further reduction in size and flattening of the direct current motor 2.

Note that in the first embodiment described above, the description was given for the case of winding the winding wire 14 on the teeth 12 that are arranged shifted in the circumferential direction by 120 degrees with respect to the segments 15 at which the start-of-winding 34 and the end-of-winding 35 of the winding wire 14 are connected, but it is not limited thereto, and may be wound sequentially on the teeth 12 that are arranged near the segments 15 at which the start-of-winding 34 and the end-of-winding 35 of the winding wire 14 are connected.

Figure 8:
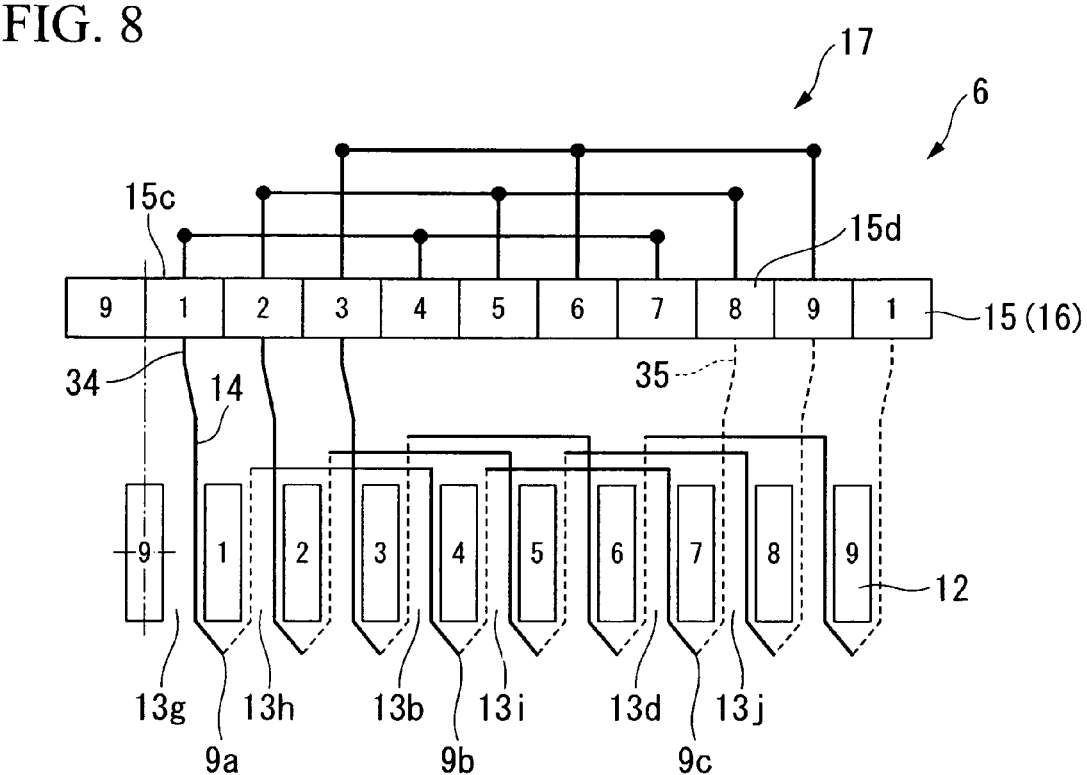
FIG. 8 is a developed view of the armature in the first embodiment of the present invention.
Figure 9:
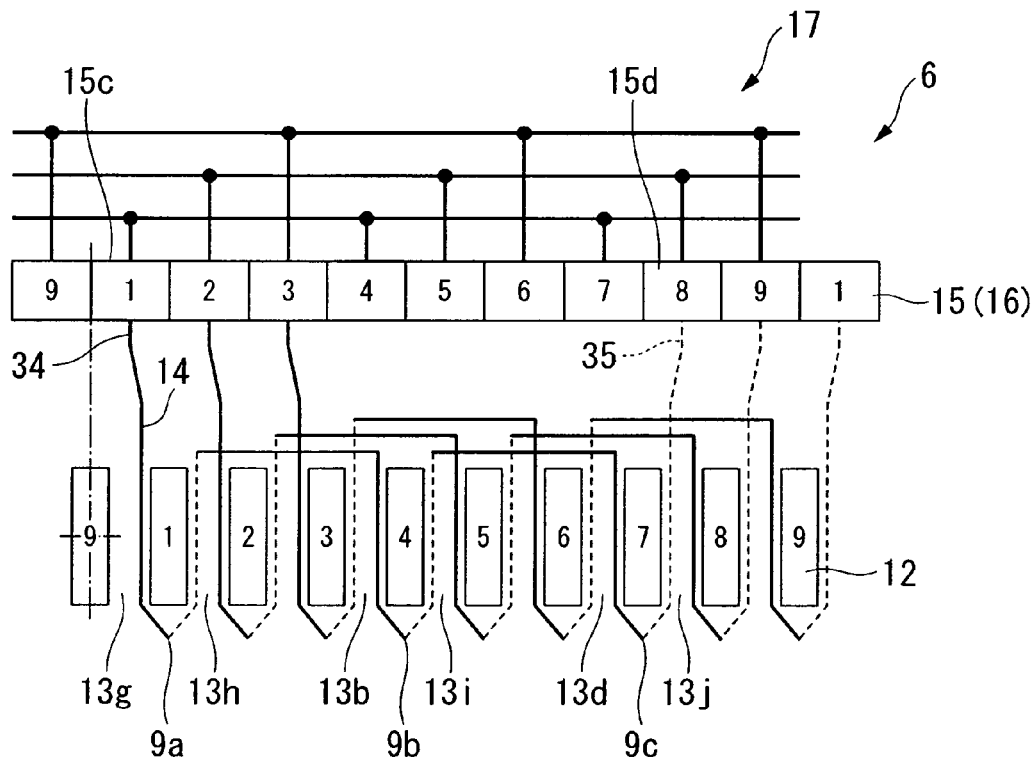
FIG. 9 is a developed view of the armature in the first embodiment of the present invention.

This shall be described in detail based on FIG. 8 and FIG. 9.

As shown in FIG. 8 and FIG. 9, in the case of the start-of-winding 34 of the winding wire 14 being wound starting from the first segment 15c, first, after being wrapped around the riser 16 of the first segment 15c, the winding wire 14 is drawn into a slot 13g between the ninth and first teeth 12 that is formed near the first segment 15c. Then, it is wound around the first tooth 12 n times in the forward direction to form the first coil 9a.

Then, the winding wire 14 is drawn out from a slot 13h between the first and second teeth 12 and drawn into a slot 13b between the third and fourth teeth 12. Then, it is wound around the fourth tooth 12 n times in the forward direction to form the second coil 9b.

Furthermore, the winding wire 14 is drawn out from a slot 13i between the fourth and fifth teeth 12 and drawn into a slot 13d between the sixth and seventh teeth 12. Then, it is wound around the seventh tooth 12 n times in the forward direction to form the third coil 9c.

The winding wire 14, after forming the third coil 9c, is drawn out from a slot 13j between the seventh and eighth teeth 12 and wrapped around the riser 16 of the eighth segment 15d that is arranged near the slot 13j. Then, the end-of-winding 35 of the winding wire 14 is connected to the eighth segment 15d. Thereby, the armature coil 9 provided with the three coils 9a, 9b, 9c that are connected in series is formed between the first and eighth segments 15c and 15d.

In the case of winding the armature coil 9 in this way, compared to the case of winding the winding wire 14 on the teeth 12 that are arranged shifted in the circumferential direction by 120 degrees with respect to the segments 15 at which the start-of-winding 34 and the end-of-winding 35 of the winding wire 14 are connected, the space between the commutator 10 and the armature core 8 is slightly enlarged, but otherwise can exhibit the same effects as the first embodiment described above.

Figure 10:
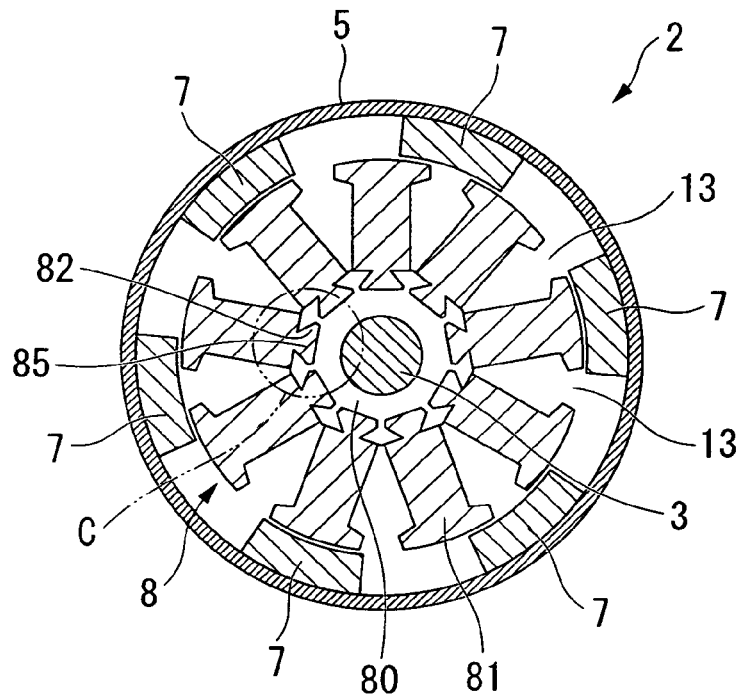
FIG. 10 is a cross-sectional view of the direct current motor in the second embodiment of the present invention.
Figure 11:
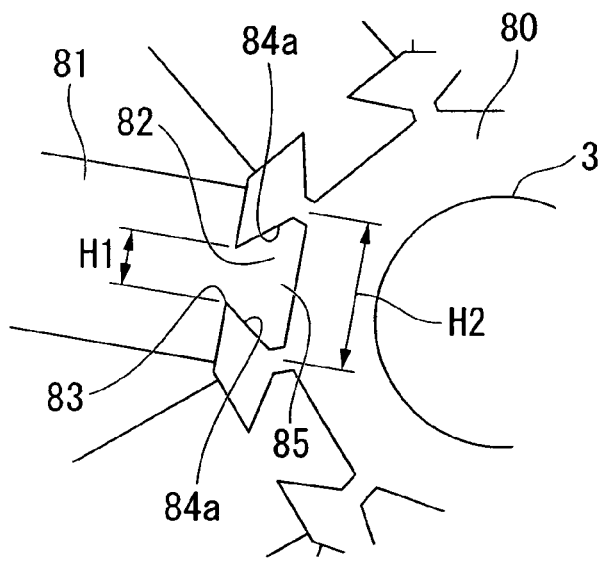
FIG. 11 is an enlarged view of portion C in FIG. 9.

Next, a second embodiment of the present invention shall be described based on FIG. 10 and FIG. 11.

The basic constitution of the second embodiment is the same as the first embodiment on the points of being a direct current motor of the three-phase concentrated winding system with six poles, nine slots and nine segments and an armature 6 arranged to freely rotate in a yoke housing 5 that has a permanent magnet 7, the point of the segments 15 having the same polarity being short circuited by the connecting wires 17, and the point of the pair of brushes 21 being mutually arranged at point symmetrical positions centered on the rotating shaft 3.

Here, as shown in FIG. 10 and FIG. 11, in an armature core 8, nine T-shaped tooth portions 81 that are detachable from an armature core body 80 are provided in a radial pattern on the armature core body 80 having an approximately cylindrical shape that is fixed to the rotating shaft 3 by being fitted from the outer side.

Nine connection recess portions 82 are formed evenly spaced over the entire lengthwise direction (axial line direction) of the armature core body 80 at regions corresponding to the tooth portions 81 of the outer peripheral surface. Each connection recess portion 82 is formed in a fan shape from an opening portion 83 toward the center of the rotating shaft 3, and has oblique walls 84a and a bottom wall 84b. That is, a width H1 in the circumferential direction of the opening portion 83 is set to be smaller than a width H2 in the circumferential direction of the bottom wall 84b.

On the other hand, a connecting projection portion 85 is formed at the portion corresponding to the connecting recess portion 82 of the armature core body 80. This connecting projection portion 85 is formed with a cross-sectional trapezoidal shape so as to correspond to the connecting recess portion 82. Thereby, the armature core body 80 and the tooth portions 81 are mutually dividable along the axial line direction.

Accordingly, the second embodiment described above can exhibit the same effect as the first embodiment. In addition, it is possible to wind the winding wire 14 by detaching the tooth portions 81 from the armature core body 80. For this reason, it is possible to easily wind the winding wire 14 on the tooth portions 81, and so it is possible to improve the working efficiency. Also, since it is possible to ensure sufficient space for winding the winding wire 14 around the tooth portions, it is possible to improve the space factor of the armature coils 9.

Figure 12:
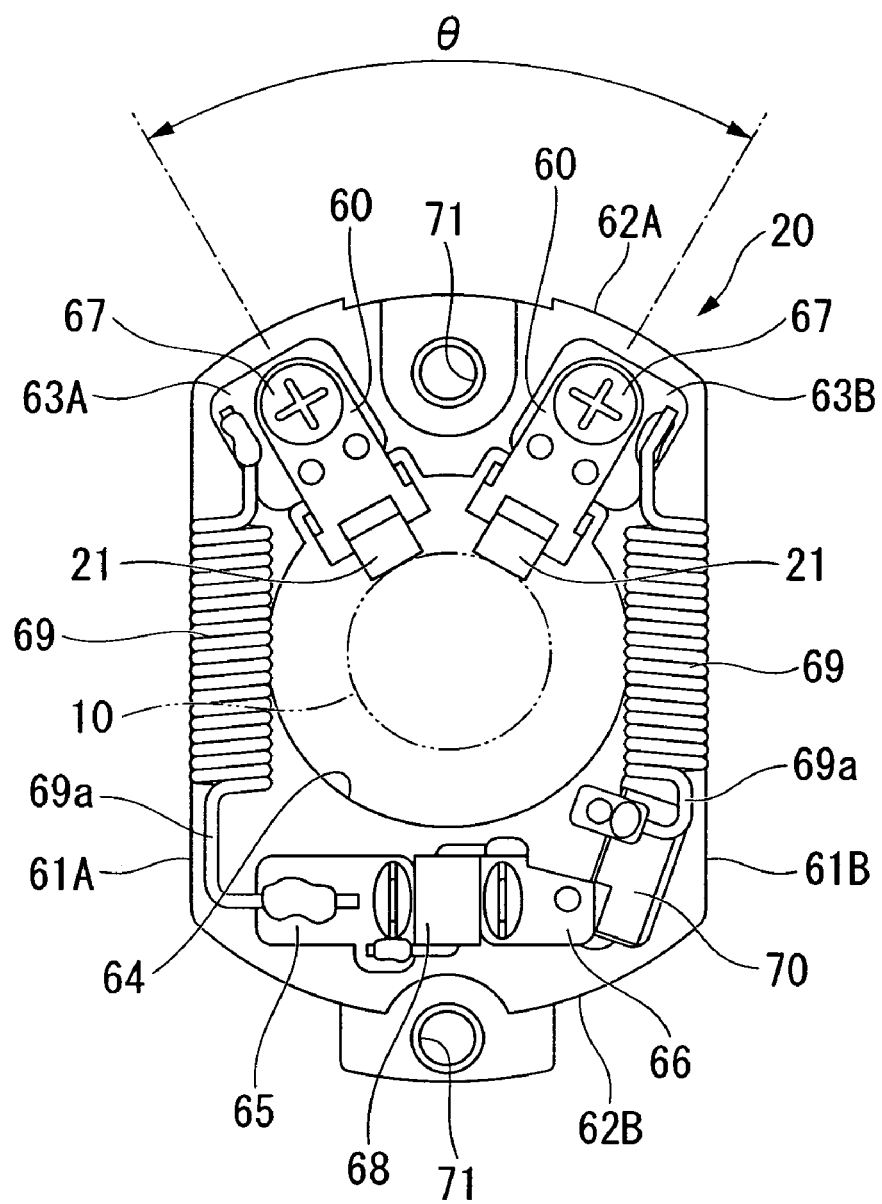
FIG. 12 is a plan view of the brush holder in the third embodiment of the present invention.
Figure 14:
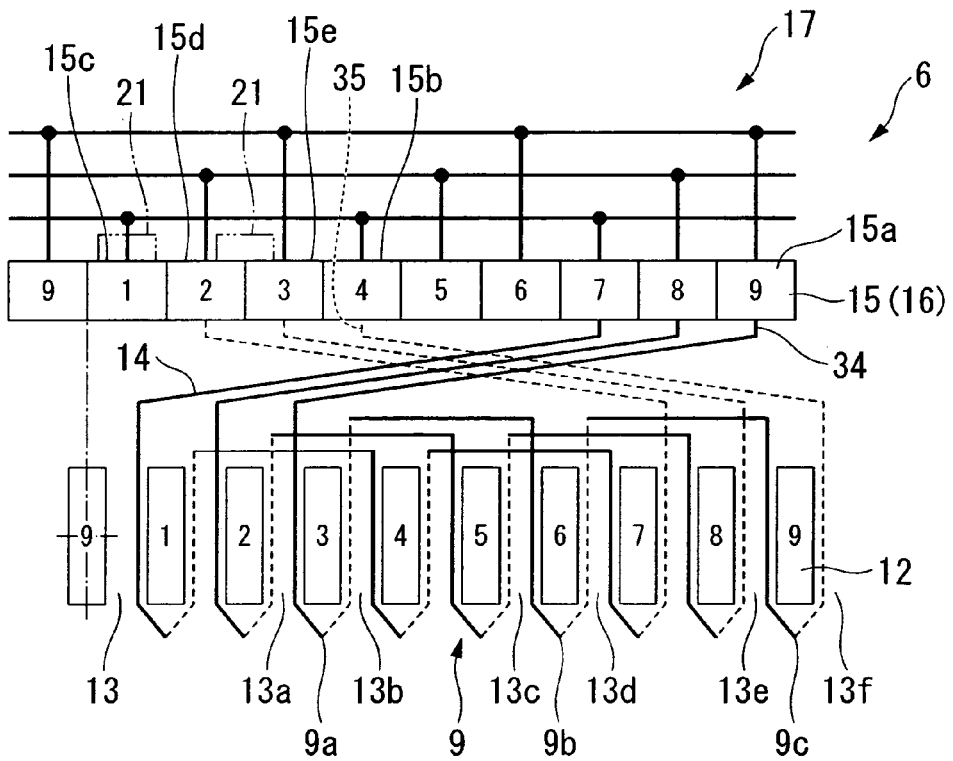
FIG. 14 is a developed view of the armature that shows the positions of the brushes in the third embodiment and the fourth embodiment of the present invention.

Next, a third embodiment of the present invention shall be described based on FIG. 12 and FIG. 14.

The basic constitution of the third embodiment is the same as the first embodiment and the second embodiment on the points of being a direct current motor of the three-phase concentrated winding system with six poles, nine slots and nine segments and an armature 6 arranged to freely rotate in a yoke housing 5 that has a permanent magnet 7 and the point of the segments 15 having the same polarity being short circuited by the connecting wires 17.

Here, in the third embodiment, the brushes 21, 21 are arranged so that the interval θ between them in the circumferential direction becomes 60 degrees.

As shown in FIG. 12, a brush holder 20 is formed with an approximately oblong cross section so as to correspond to the flange housing portion 5B, and has a pair of plane walls 61A, 61B and a pair of curved walls 62A, 62B, with an insertion hole 64 that allows insertion of the commutator 10 formed in its center in the plane view.

A pair of stays 63A, 63B that are electrically conductive are provided nearer to both of the plane walls 61A, 61B on the side of the one curved wall 62A (the upper side in FIG. 12) on the brush holder 20.

The brushes 21 are provided in these stays 63A, 63B in a state of being biased to the side of the commutator 10 via a blade spring 60. The brushes 21, 21 are arranged so that the mutual interval θ in the circumferential direction becomes 60 degrees, and the distal end portions thereof enter a state of making sliding contact with the commutator 10 by being biased by the blade spring 60. The blade spring 60 is formed by bending a conductive plate, and is fastened to the stay 63 by a bolt 67.

Also, a pair of power feeding portions 65, 66 are provided on the side of the other curved wall 62B (the lower side in FIG. 12) on the brush holder 20. These power feeding portions 65, 66 are for supplying power to each brush 21, and are electrically connected to a connector 29 described below. A condenser 68 that straddles both power feeding portions 65, 66 is provided between the pair of power feeding portions 65, 66, and the pair of power feeding portions 65, 66 are electrically connected by this condenser 68.

Moreover, between one power feeding portion 65 among the pair of power feeding portions 65, 66 (the left hand side power feeding portion in FIG. 12) and the stay 63A that is oppositely arranged in the direction along the plane walls 61A, 61B, a choke coil 69 that straddles both 65, 63A (arranged along the vertical direction in FIG. 12), and the power feeding portion 65 and the stay 63A are electrically connected by this choke coil 69. That is, the brush 21 that is provided at the stay 63A is electrically connected to the power feeding portion 65 via the choke coil 69.

Also, the other power feeding portion 66 among the pair of power feeding portions 65, 66 (the right hand side power feeding portion in FIG. 12) and the stay 63B that is oppositely arranged in the direction along the plane walls 61A, 61B are electrically connected via the choke coil 69 and a circuit breaker 70.

Here, the condenser 68 is what is called a noise prevention element that absorbs electrical noise. The choke coil 69 is also a noise prevention element, and is wound with a winding wire 69a on an insulating core material (not illustrated). Also, the circuit breaker 70 prevents a fire due to a failure or short circuiting and the like of a device (the direct current motor 2) by automatically cutting off the circuit when an excessive current or an abnormal current has flowed through the electrical circuit.

In other words, in this third embodiment, the condenser 68 and the choke coil 69 that are noise prevention elements are arranged on approximately the same plane as the brushes 21, 21 on the brush holders 20 and between the brushes 21, 21 and the power feeding portions 65, 66.

In addition, bolt holes 71, 71 for fastening the brush holder 20 to the worm gear reducer 4 are provided on brush holder 20 on the side of the curved walls 62A, 62B.

Figure 13:
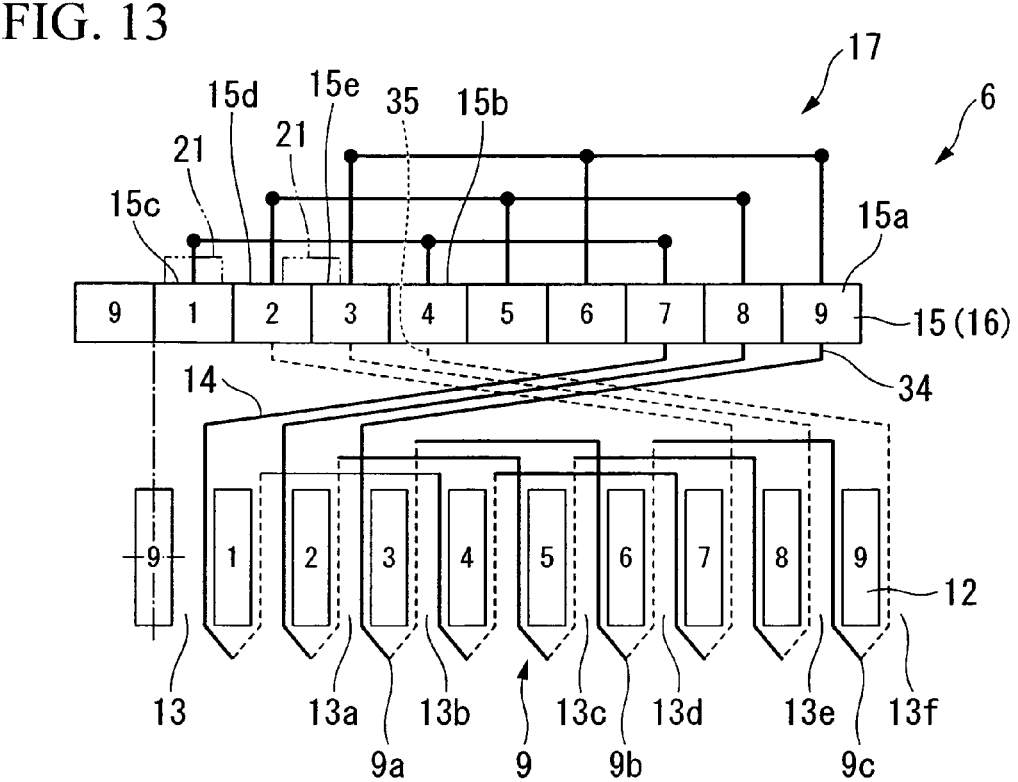
FIG. 13 is a developed view of the armature that shows the positions of the brushes in the third embodiment and the fourth embodiment of the present invention.

The brushes 21, 21 are arranged with a mutual interval of 60 degrees in the circumferential direction, and as shown in FIGS. 13, 14, for example when one brush 21 is abutting the first segment 15c, the other brush 21 is abutting by straddling both the second segment 15b and the third segment 15e.

Accordingly, according to the above third embodiment, it is possible to arrange the pair of brushes at a mutual interval of 60 degrees in the circumferential direction by having the constitution of the direct current motor 2 consist of six poles, nine slots and nine segments and the segments 15 having the same polarity being short-circuited with the connecting wires 17. For this reason, when using the brush holders 20 of almost the same size as conventional brush holders, it is possible to ensure space between the brushes 21, 21 and the power feeding portions 65, 66 and on approximately the same plane as the brushes 21, 21 compared to arranging the pair of brushes 21, 21 at point symmetrical positions centered on the rotating shaft 3, that is, oppositely arranging the brushes 21, 21.

Moreover, the choke coils 69 that are noise prevention elements are arranged in this space, that is, the choke coils 69 are arranged in the vicinity of the brushes 21 that are the generation source of electrical noise and on approximately the same plane as the brushes 21. For this reason, it is possible to arrange the choke coils 69 at locations with a high noise reduction effect and it is possible to simplify attachment of the choke coils 69 without enlarging the brush holder 20.

Figure 15:
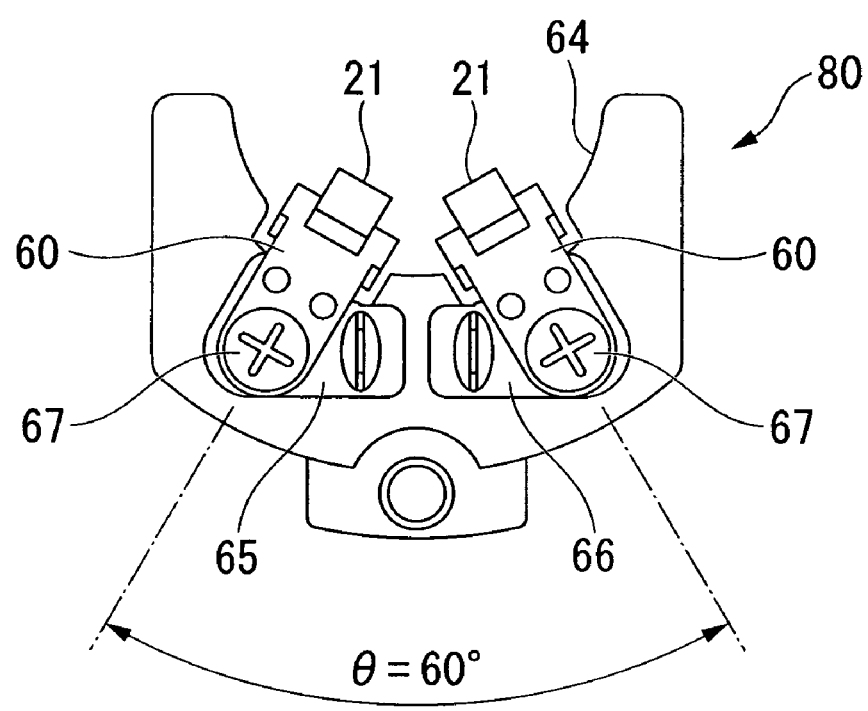
FIG. 15 is a plan view of the brush holder in the fourth embodiment of the present invention.

Next, a fourth embodiment of the present invention shall be described based on FIG. 15.

The basic constitution of the fourth embodiment is the same as the third embodiment on the points of being a direct current motor with six poles, nine slots and nine segments and an armature 6 arranged to freely rotate in a yoke housing 5 that has a permanent magnet 7, the point of the segments 15 having the same polarity being short-circuited by the connecting wires 17, and the point of the pair of brushes 21, 21 being arranged with a mutual interval of 60 degrees in the circumferential direction. Note that the description will be made by denoting the same aspects as the third embodiment with the same reference numerals.

Here, in a brush holder 80 of the fourth embodiment, the condenser 68, the choke coils 69, and the circuit breaker 70 are not provided. For this reason, the brushes 21, 21 are provided on the power feeding portions 65, 66 biased to the side of the commutator 10 directly via blade springs 60, 60 without the need to provide a space for arranging choke coils 69 and a circuit breaker 70 between the power feeding portions 65, 66 and the brushes 21, 21.

Accordingly, according to the above fourth embodiment, in the case of the condenser 68, the choke coils 69, and the circuit breaker 70 not being required, it is possible to achieve a concentrated arrangement of the pair of power feeding portions 65, 66 and the pair of brushes 21, 21 in a portion of the brush holder 80. For this reason, compared to the case of oppositely arranging the pair of brushes as is done conventionally, it is possible to make the brush holder smaller, and as a result it is possible to further downsize the direct current motor 2.

Note that as when winding the armature coil 9 in the third embodiment and the fourth embodiment described above, as shown in FIG. 6, FIG. 7, FIG. 13, and FIG. 14, the winding wire 14 may be wound on the teeth 12 that are arranged shifted 120 degrees in the circumferential direction with respect to the segments 15 at which the start-of-winding 34 and the end-of-winding 35 of the winding wire 14 are connected, and as shown in FIG. 8 and FIG. 9, the winding wire 14 may also be wound in turn on the teeth 12 that are arranged near the segments 15 at which the start-of-winding 34 and the end-of-winding 35 of the winding wire 14 are connected.

Figure 16:
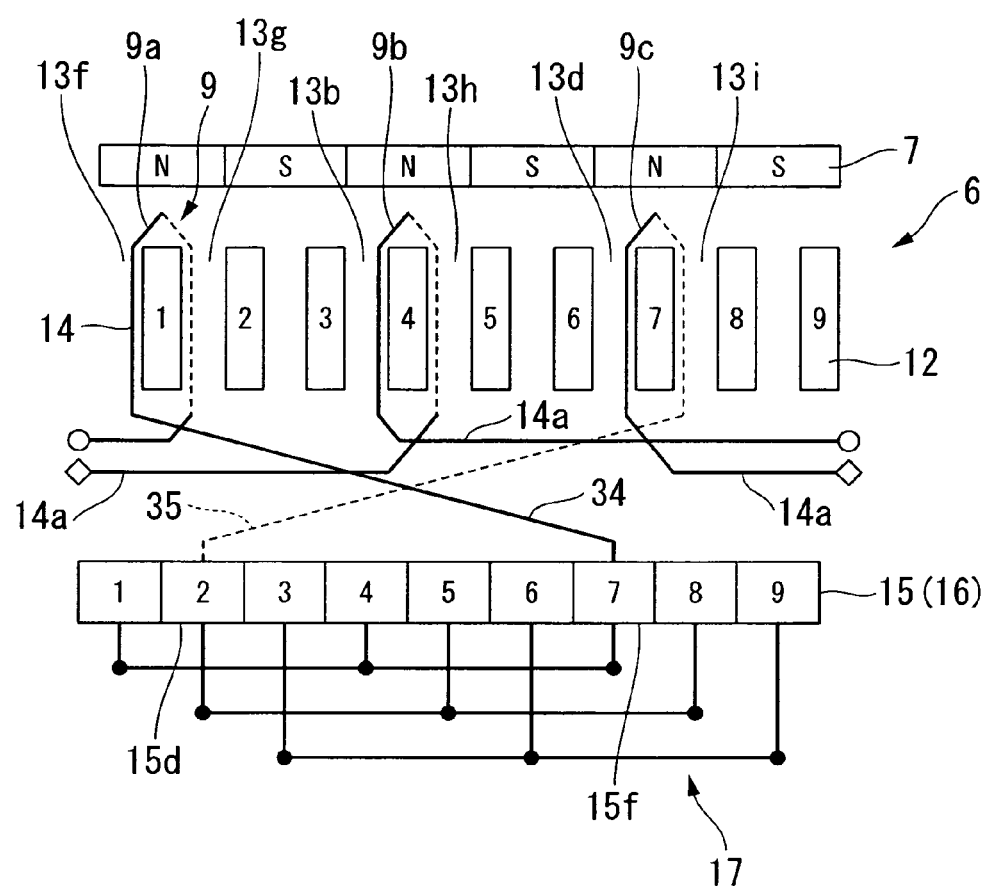
FIG. 16 is a developed view of the armature in the fifth embodiment of the present invention.
Figure 17:
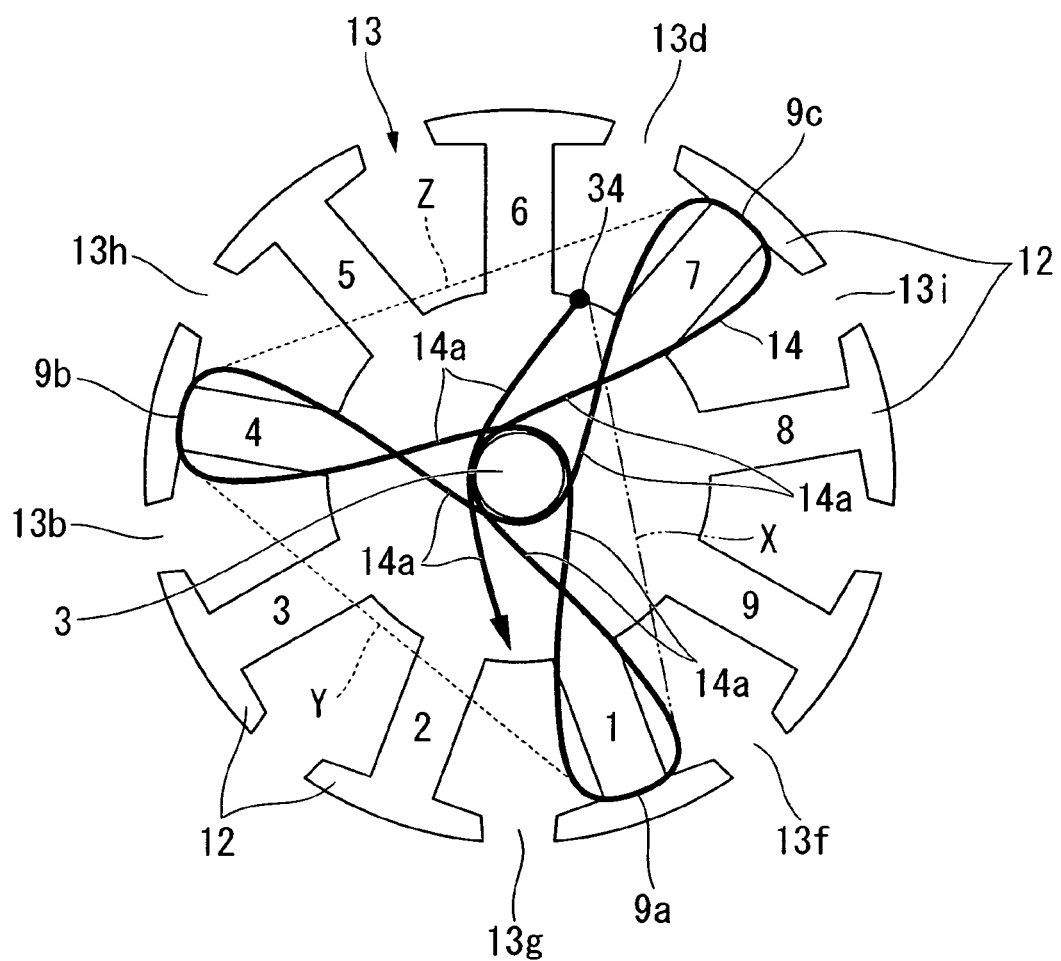
FIG. 17 is an explanatory view that shows the paths of the bridge paths of the winding wire in the fifth embodiment of the present invention.
Figure 18:
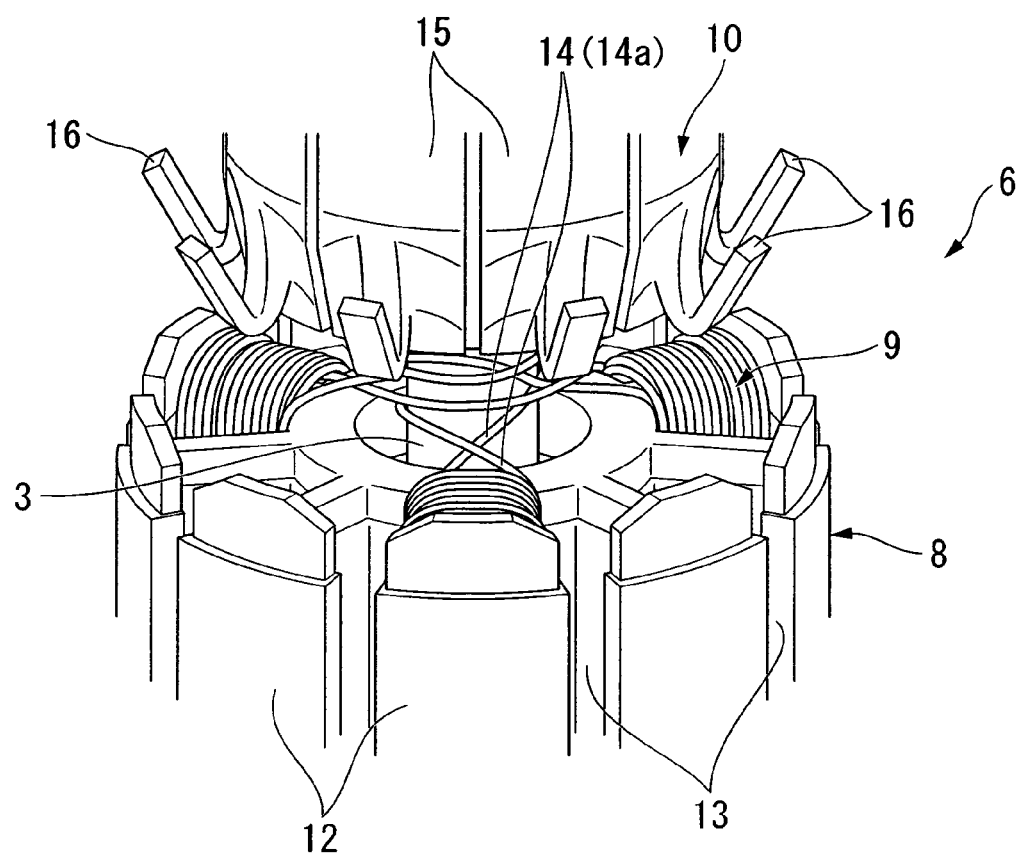
FIG. 18 is a main portion enlarged perspective view of the armature in the fifth embodiment of the present invention.

Next, a fifth embodiment of the present invention shall be described based on FIG. 16 to FIG. 18.

FIG. 16 is a developed view of the armature 6 that shows the state of the armature coils 9 being wound in this fifth embodiment. FIG. 17 is an explanatory drawing that shows the bridge paths of the winding wire 14. FIG. 18 is a perspective view that enlarges the under neck of the commutator 10 of the armature 6. Note that in the developed view of the armature 6 in FIG. 16, the basic constitution is the same as the developed view of the above-mentioned armature 6 of FIG. 6, but the drawing is flipped vertically for convenience of explanation.

In the fifth embodiment, a crossover wire 14a of the winding wire 14 that crosses over between the slots 13 is bridged to the rotating shaft 3.

Specifically, for example in the case of the start-of-winding 34 of the winding wire 14 being wound starting from the seventh segment 15f, first, after being wrapped around the riser 16 of the seventh segment 15f, it is drawn into a slot 13f between the first and ninth teeth 12 that is formed at a 120-degree interval in the circumferential direction from the seventh segment 15f.

At this time, the crossover wire 14a of the winding wire 14 that is routed from the seventh segment 15f to the slot 13f is bridged to the rotating shaft 3.

That is, in FIG. 17, the crossover wire 14a that is routed from the start-of-winding 34 to the slot 13f is routed to the slot 13f by being diverted to the left side centered on the rotating shaft 3 instead of passing along the shortest path (refer to the double-dashed line X in FIG. 17) on the right side centered on the rotating shaft 3.

The winding wire 14 that has been drawn into the slot 13f is subsequently wound around the first tooth 12 n times in the forward direction to form the first coil 9a.

Then, the winding wire 14 is drawn out from the slot 13g between the first and second teeth 12 and drawn into a slot 13b between the third and fourth teeth 12. At this time as well, the crossover wire 14a that is routed from the slot 13g to the slot 13b is bridged to the rotating shaft 3. Then, the winding wire 14 that is drawn into the slot 13b it is wound around the fourth tooth 12 n times in the forward direction to form the second coil 9b.

After forming the second coil 9b, furthermore, the winding wire 14 is drawn out from the slot 13h between the fourth and fifth teeth 12 and, by again bridging the crossover wire 14a to the rotating shaft 3, drawn into the slot 13d between the sixth and seventh teeth 12. Then, it is wound around the fourth tooth 12 n times in the forward direction to form the third coil 9c.

The winding wire 14, after forming the third coil 9c, is drawn out from the slot 13i between the seventh and eighth teeth 12 and wrapped around the riser 16 of the second segment 15d that is arranged at a 120-degree interval in the circumferential direction from the slot 13i. Then, the end-of-winding 35 of the winding wire 14 is connected to the eighth segment 15d. At this time as well, the crossover wire 14a from the slot 13i to the second segment 15d is bridged to the rotating shaft 3. This is performed between the predetermined segments 15 in sequence to form the armature coils 9 of the three-phase concentrated winding system.

Accordingly, the above-mentioned fifth embodiment can exhibit the same effect as the first embodiment. In addition, by bridging the crossover wire 14a of the winding wire 14 between the slots 13 to the rotating shaft 3, it is possible to prevent the start-of-winding and the end-of-winding of the coils 9a, 9b, 9c that are wound on the teeth 12 from being arranged spreading in the circumferential direction toward the preceding and following coils. That is, for example, it is possible to prevent the winding wire 14 at the winding start of the second coil 9b from spreading toward the side of the first coil 9a (refer to the dashed line Y in FIG. 17) and the winding wire 14 at the winding end of the second coil 9b from spreading toward the side of the third coil 9c (refer to the dashed line Z in FIG. 17). For this reason, it is possible to prevent the start-of-winding and the end-of-winding of the coils 9a, 9b, 9c from becoming caught on adjacent teeth 12 (for example, the third tooth 12 and the fifth tooth 12), and it is possible to reliably wind the respective start-of-winding and the end-of-winding on the intended teeth 12 (refer to FIG. 18). Thereby, it is possible to easily prevent winding collapse of the armature coils 9 that are wound on the teeth 12, and possible to improve the space factor and possible to prevent unbalancing of the armature 3 due to coil collapse.

Note that the present invention is not limited to the above-mentioned embodiments, and may include various modifications to the above-mentioned embodiments within the scope of not departing from the spirit or scope of the present invention.

Moreover, the above-mentioned embodiments were described for the case of applying the direct current motor 2 to a power window device 1, but it is not limited thereto, and can be applied as a motor for a driving a sun roof of a vehicle and as a motor for an electric seat.

Also, in the above-mentioned embodiments, the description was given for the case of six tile-shaped permanent magnets 7 that are divided in the circumferential direction being fixed at even intervals to the inner circumferential surface of the yoke body 5A, but are not limited thereto, and it is possible to magnetize a polar anisotropic rare-earth bonded magnet that is formed in a hollow cylindrical shape with six poles.

Also, the above-mentioned embodiments were described for the case of using a neodymium sintered magnet as the permanent magnets 7, but not limited thereto, and it may be a sintered ferrite magnet or a neodymium bonded magnet.

INDUSTRIAL APPLICABILITY

According to the present invention, in a direct current motor with brushes, assuming the constitution of the direct current motor has six poles, nine slots and nine segments, and since the segments of the same polarity are short-circuited by short-circuiting members, it is possible to pair the brushes to be installed. Moreover, since the pair of brushes is arranged so as to be mutually point symmetric centered on the rotating shaft, it is possible to achieve a flattening of the direct current motor compared to the case of the brushes being arranged at 90 degrees relative to each other.

The invention claimed is:

1. A direct current motor comprising a yoke housing, a permanent magnet that is fixed to the inner circumferential surface of the yoke housing with the number of magnetic poles being six, and an armature that is supported on the inner side of the permanent magnet in a freely rotatable manner, wherein the armature comprises a rotating shaft that is supported by the yoke housing, an armature core that is fitted and fixed to the rotating shaft from an outer side of the rotating shaft, and a commutator that is provided on the rotating shaft adjacent to the armature core with nine segments arranged in the circumferential direction;

the armature core has nine teeth that extend in the radial direction in a radial pattern and nine slots that are formed between the teeth and extend in the axial direction;

the segments having the same polarity are connected with a short-circuiting member;

an armature coil provided to the teeth comprises three sets of three coils, with each set including a first coil, a second coil and a third coil connected in series and arranged at an interval of 120° in the circumferential direction with respect to each other; and a pair of brushes that make sliding contact with the segments is disposed so as to be mutually point symmetric centered on the rotating shaft.

2. The direct current motor according to claim 1, wherein coils are wound on the teeth with a concentrated winding system.

3. The direct current motor according to claim 1, wherein the permanent magnet is a rare earth magnet.

4. The direct current motor according to claim 1, wherein the teeth of the armature core are constituted to be dividable along the axial line direction.

5. The direct current motor according to claim 1, wherein all crossover wires of the coils that cross over between the slots and are wound on the teeth are bridged to the rotating shaft.

\* \* \* \* \*